US008084895B2

(12) United States Patent
Allen et al.

(10) Patent No.: US 8,084,895 B2
(45) Date of Patent: Dec. 27, 2011

(54) SAFETY DEVICE FOR ELECTRICAL DISTRIBUTION BOARDS

(75) Inventors: James David Allen, Swindon (GB); Andrew Purdie Baker, Swindon (GB)

(73) Assignee: Schneider Electric Industries SAS, Rueil Maimaison (FR)

( * ) Notice: Subject to any disclaimer, the term of this patent is extended or adjusted under 35 U.S.C. 154(b) by 213 days.

(21) Appl. No.: 12/453,967

(22) Filed: May 28, 2009

(65) Prior Publication Data

US 2010/0007222 A1 Jan. 14, 2010

(30) Foreign Application Priority Data

Jul. 9, 2008 (GB) .................................. 0812550.2

(51) Int. Cl.
*H02H 7/22* (2006.01)
*H02H 11/00* (2006.01)

(52) U.S. Cl. ...................................................... 307/326

(58) Field of Classification Search .................. 307/326
See application file for complete search history.

(56) References Cited

U.S. PATENT DOCUMENTS 6,545,234 B1 * 4/2003 Trivette et al. ............ 200/50.21

FOREIGN PATENT DOCUMENTS

JP 2008226852 A * 9/2008

* cited by examiner

*Primary Examiner* — Jared Fureman
*Assistant Examiner* — Adi Amrany
(74) *Attorney, Agent, or Firm* — Steptoe & Johnson LLP

(57) ABSTRACT

A shock prevention device for an electrical distribution board having at least one incoming terminal and one or more bus conductors for distributing electrical power from the incoming terminal to a plurality of outgoing conductor terminals projecting from a housing of the distribution board, the shock prevention device comprising an insulating body adapted to receive and shroud at least one conductor terminal; a moveable element moveable relative to the body so as to place the device in one of a first configuration in which the device can be fitted to or removed from the distribution board so as to cover the exposed terminal and a second configuration in which the device is braced between the conductor terminal and part of the distribution board housing, whereby removal of the device is prevented; and means for locking the moveable element in the second configuration.

12 Claims, 8 Drawing Sheets

SAFETY DEVICE FOR ELECTRICAL DISTRIBUTION BOARDS

This application claims the benefit of GB Application No. 0812550.2, filed Jul. 9, 2008, the entire contents of which are hereby incorporated by reference.

The present invention relates to a shock prevention device for an electrical distribution board.

An electrical distribution board distributes electrical power from one or more incoming power supply terminals to a number of outgoing power supply terminals. Typically, the electrical distribution board comprises one or more bus conductors which run the length of the board. The bus conductors carry the incoming electrical power to one or more outgoing "stab" conductors which are, in turn, connected to one or more circuit breakers of the outgoing circuit.

In the case where the bus conductors of the electrical distribution board are connected directly to the stab conductors, when work is required to be carried out on one or more of the outgoing circuits the circuit breakers are used to break the electrical connection between the stab conductors and the outgoing circuit. Then, in order to prevent the circuit breakers from being accidentally reconnected, a plastic cover or electrical insulation tape is placed over the circuit breaker switch. Alternatively, and more properly, the circuit breaker is removed from the distribution board and a blanking module is used to cover the stab conductor. Once the work is complete the cover or the tape or blanking module are removed and the outgoing circuit reconnected. The tape technique is not recommended or officially sanctioned, but often happens in practice.

The electrical distribution board may additionally include an isolation switch positioned between the bus conductor and the stab conductor. Schneider Electric in particular supplies "Isobar" brand of boards with this feature. The purpose of the isolation switch is to allow unused stab conductors to be electrically isolated from the bus conductor. This facility is not designed to prevent electric shock when work is required to be carried out on the outgoing circuit, but is sometimes used by workers for that purpose.

With these known precautions, there remains a risk of electrocution by virtue of the fact that the outgoing circuit could be prematurely re-energised either by someone accidentally operating the isolation switch, or the circuit breaker switch (for example by pressing against the switch through the insulating tape, or when the tape falls off prematurely). Someone may remove the cover or blanking module and operate the switch on the assumption that the work had been completed. Where different electricians are working on different circuits, one may accidentally re-energise the wrong circuit when he has completed his own work.

It is an object of the present invention to provide a shock prevention device for an electrical distribution board which obviates or mitigates one or more of the disadvantages referred to above.

According to a first aspect of the present invention there is provided a shock prevention device for an electrical distribution board having at least one incoming terminal and one or more bus conductors for distributing electrical power from the incoming terminal to a plurality of outgoing conductor terminals projecting from a housing of the distribution board, the shock prevention device comprising:

- an insulating body adapted to receive and shroud at least one conductor terminal;
- a moveable element moveable relative to the body so as to place the device in one of a first configuration in which the device can be fitted to or removed from the distribution board so as to cover the exposed terminal and a second configuration in which the device is braced between the conductor terminal and part of the distribution board housing, whereby removal of the device is prevented; and
- means for locking the moveable element in the second configuration.

Preferably, the locking means is key-operated, combination-operated or tool-operated to prevent unauthorised unlocking.

In one embodiment, the locking means comprises an aperture in one or both of the moveable element and the insulating body, for receiving a padlock.

In another embodiment, the means for locking the moveable element in the second configuration includes a barrel lock mounted in one of the insulating body and moveable element which engages with a corresponding recess in the other of the insulating body and moveable element.

In one embodiment, the device is adapted to fit into an L-shaped profile in the distribution board housing, one leg of the L having the conductor terminal projecting therefrom and the other leg having a circuit breaker mounting rail projecting therefrom, removal of the device in the second configuration being prevented by engagement with the conductor terminal on the one hand and the mounting rail on the other.

The moveable element may be arranged for example to engage the conductor terminal in the second configuration, while part of the body engages the mounting rail. In other embodiments these roles could be reversed, to similar effect.

The moveable element may be arranged to engage with the conductor terminal by abutting against a rear portion thereof in the second configuration.

Preferably, the moveable element remains captive in the body when in the first configuration. This prevents the parts of the device becoming separated and lost when not in use.

The moveable element may be retained in the body by a snap fit engagement between the moveable element and the insulating body.

In a device adapted for use on a distribution board which includes at least one mechanical isolation switch to electrically isolate one or more conductor terminals from the bus conductors, the shock prevention device may include a portion which is configured to prevent mechanical operation of the isolation switch.

The insulating body of the shock prevention device may for example include a first cover member which substantially covers the isolation switch to prevent hand operation thereof.

In further embodiments, the insulating body is adapted to receive and shroud two or more conductor terminals. In such a case, the insulating body may include two or more moveable elements.

The shock prevention device may further include a second cover member, the second cover member being adapted to cover at least a portion of one or more conductor terminals which are not received and shrouded by the insulating body.

The second cover member may be formed separately from the insulating body. In one embodiment, a second cover member is adapted to extend over one or more conductor terminals between conductor terminals covered by the insulating body of two separate devices. The circuit breaker mounting rail is typically a DIN rail. The general configuration of distribution boards with DIN rails is fairly conventional even though each manufacturer has its own particular form. The device may be generic to different models, or specific to a particular range.

According to a second aspect of the present invention there is provided a shock prevention kit for an electrical distribution board having at least one incoming terminal and one or more bus conductors for distributing electrical power from the incoming terminal to three or more outgoing conductor terminals projecting from a housing of the distribution board, the shock prevention kit comprising:

at least two shock prevention devices according to the first aspect of the present invention as set forth above; and a cover member configured to be mounted between two shock prevention devices to cover at least a portion of at least one conductor terminal to prevent contact therewith, additional to conductor terminals covered by the mentioned devices.

The cover member may be adapted to snap fit into engagement with each shock prevention device.

In embodiments for use where the distribution board includes at least one mechanical isolation switch to electrically isolate one or more conductor terminals from the bus conductors, the cover member may include a portion configured to prevent mechanical operation of the isolation switch.

The other optional features of the first aspect may be applied equally in the kit of the second aspect.

The invention further provides methods of protecting against shock using the devices of the invention as set forth above. The invention further provides assemblies of distribution board and protective device in combination.

These and further aspects of the invention will be illustrated in the embodiments which follow.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1A:
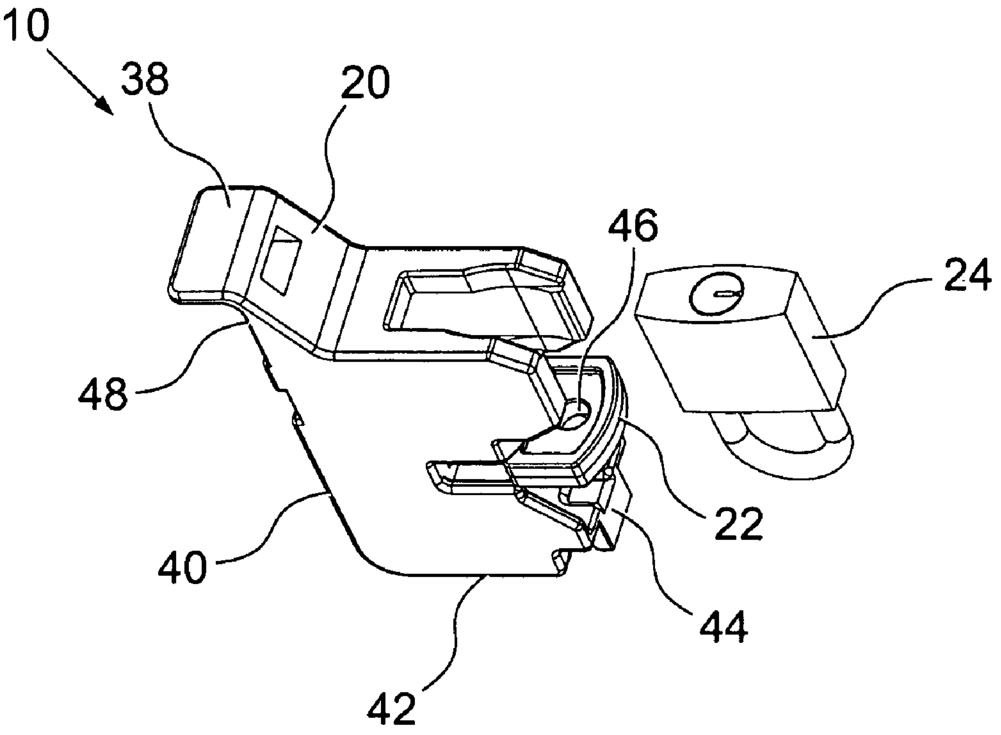
FIGS. 1*a* and 1*b* are perspective views of a shock prevention device for an electrical distribution board according to the first embodiment of the present invention in an unlocked and locked state, respectively.

FIGS. 1*a* to 1*e* illustrate a shock prevention device 10 for an electrical distribution board 12 (see FIGS. 3*a* to 5*b*, which illustrates part of an electrical distribution board). The electrical distribution board 12 has at least one incoming terminal (not shown) and one or more bus conductors (not shown) for distributing electrical power from the incoming terminal to a plurality of outgoing conductor terminals 14 (or "stabs"). The stabs 14 project from a housing 16 of the distribution board 12. The stabs 14 are connected to circuit breakers (not shown) which are, in turn, connected to the outgoing circuits (e.g. lighting circuits etc.).

In the embodiment described and illustrated here, the distribution board 12 also includes a plurality of isolation switches 18. The purpose of the isolation switch 18 is to act as a safety device which allows each stab 14 to be electrically isolated from the bus conductor. The isolation switches 18 operate by simply sliding in the horizontal direction within the housing 16. In the embodiment illustrated in FIGS. 3*a* to 5*b* the isolation switches are all in the "off" position, i.e. the stabs 14 are disconnected from the bus conductors. It should be appreciated, however, that the distribution board 12 may not include any isolation switches 18 and the bus conductors may be connected directly to the stabs 14.

The shock prevention device 10 comprises an insulating body 20 which is adapted to receive and shroud at least one stab 14 of the distribution board 12 (see FIG. 2*f*), a moveable element 22 for securing the device 10 to the distribution board 12 and locking means 24 for locking the device 10 in place.

Figure 1B:
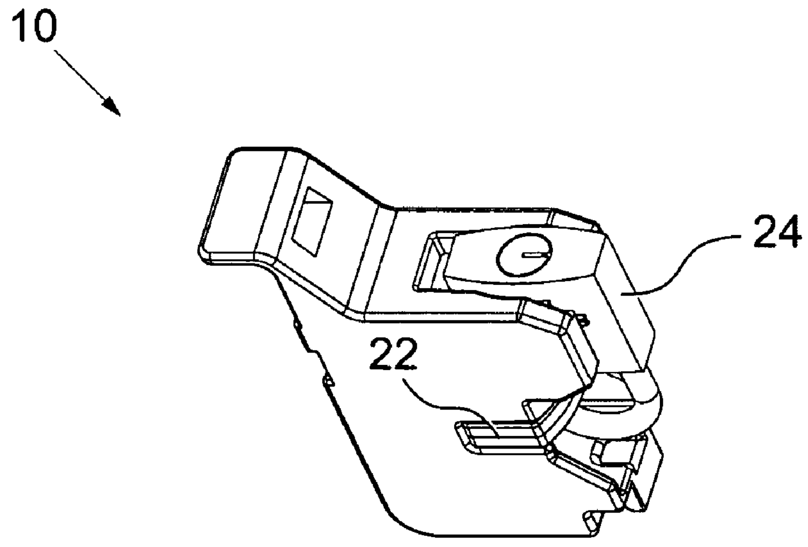
Figure 1C:
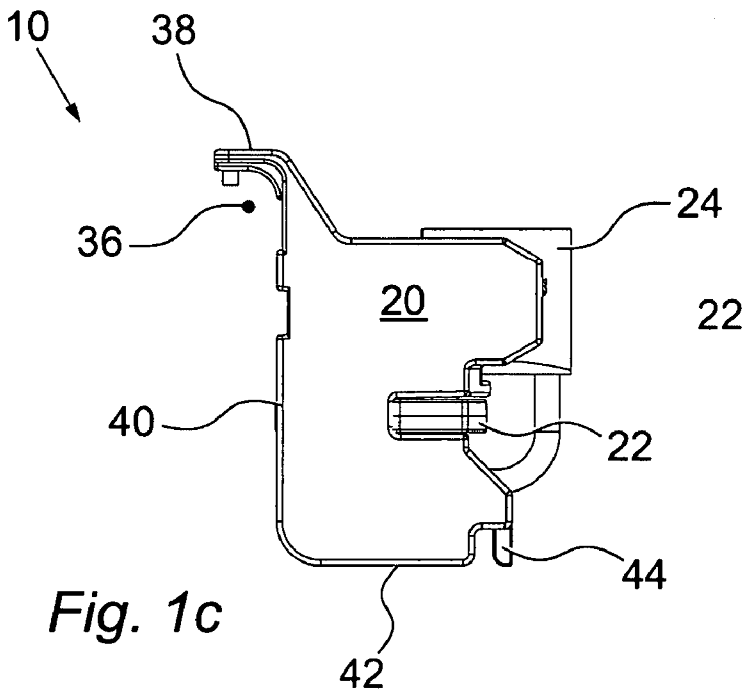
FIGS. 1*c* to 1*e* are left side, top side and front side views of the shock prevention device of FIG. 1*b;*
Figure 1D:
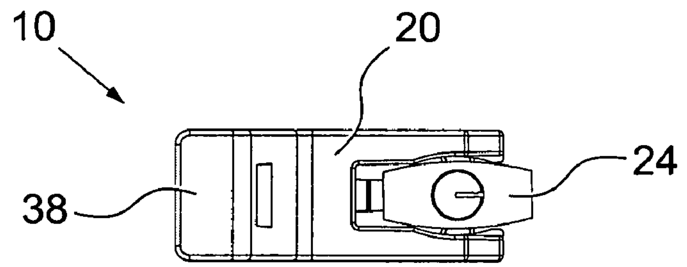
Figure 1E:
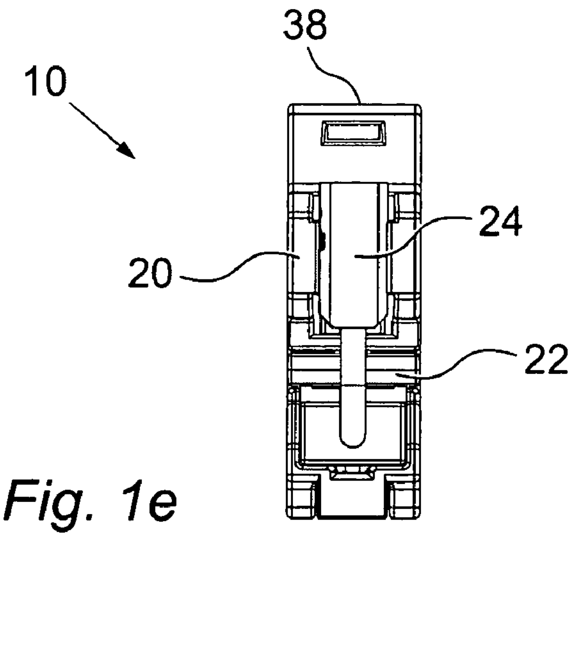
Figure 2A:
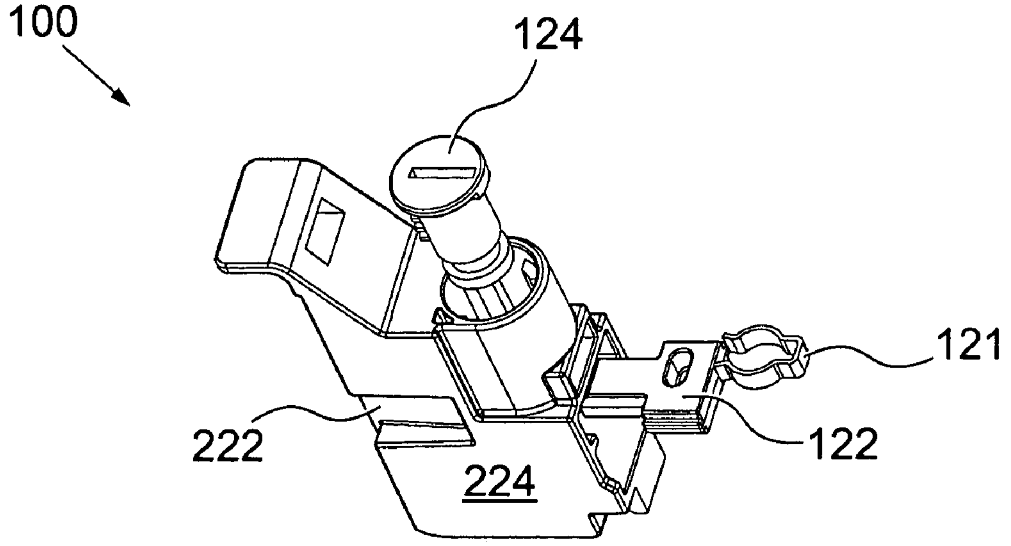
FIGS. 2*a* and 2*b* are perspective views of a second embodiment of the shock prevention device of FIGS. 1*a* to 1*e;*
Figure 2B:
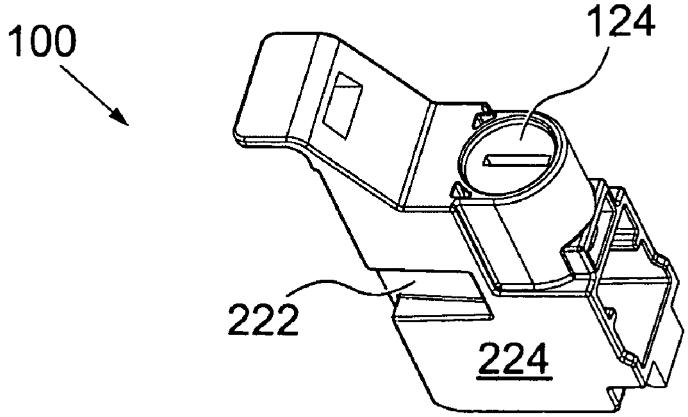
Figure 2C:
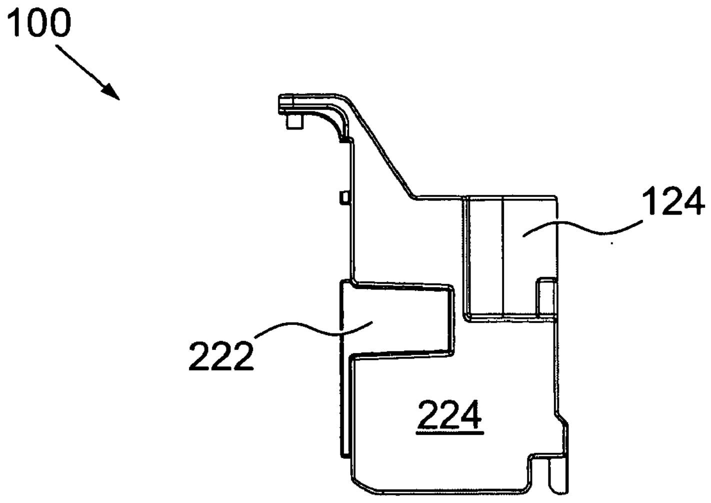
FIGS. 2*c* to 2*e* are left side, top side and front side views of the shock prevention device of FIG. 2*b;*
Figure 2D:
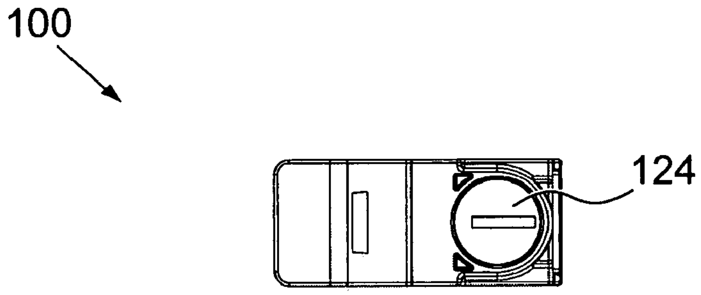
Figure 2E:
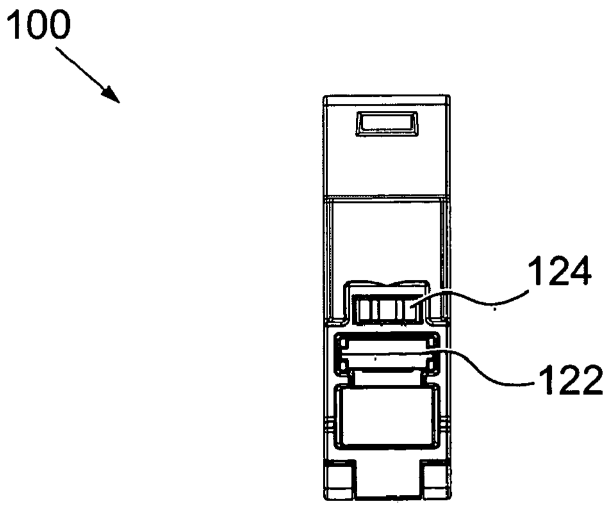
Figure 2F:
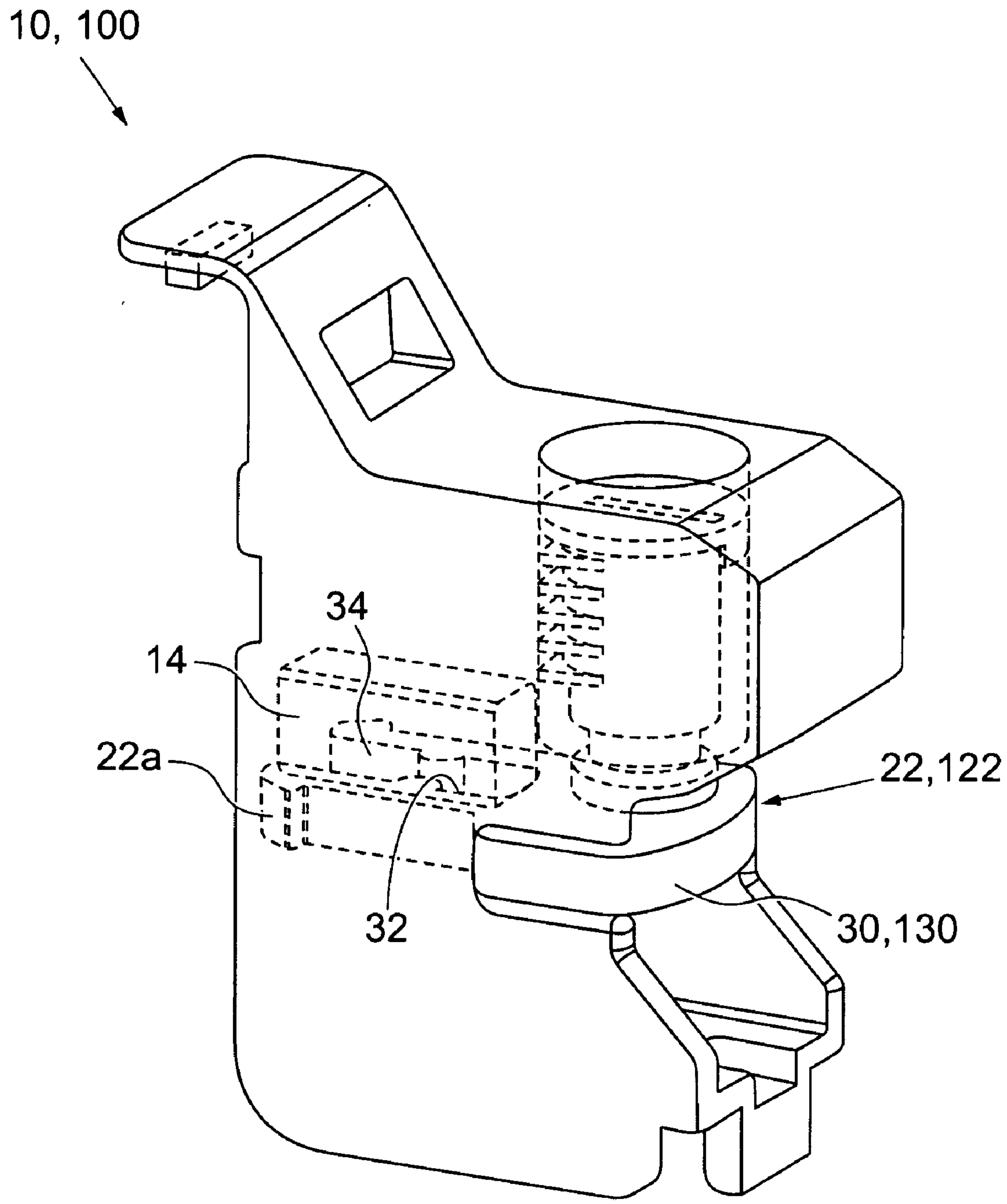
FIG. 2*f* is an isometric line drawing of the shock prevention device of FIG. 2*b* detailing the engagement between the moveable element and an outgoing conductor terminal.

With reference to FIGS. 1*a*, 1*b* and 2*f*, the moveable element 22 is moveable relative to the insulating body 20 between a first position in which the moveable element 22 is disengaged from the stab 14 (FIG. 1*a*) and a second position in which the moveable element 22 is engaged with the stab 14 (FIGS. 1*b* and 2*f*). As best illustrated in FIG. 2*f*, the moveable element 22 has a body 30 which includes an abutment portion 32. In the engaged state the abutment portion 32 slides underneath the stab 14 and abuts against the lower, or rear, side portion thereof. The body 30 also defines a passage 34 adjacent the abutment portion 32 which allows the stab 14 to pass therethrough to facilitate removal of the device 10 from the distribution board 12 when the moveable element is in the first position (see below).

Figure 3A:
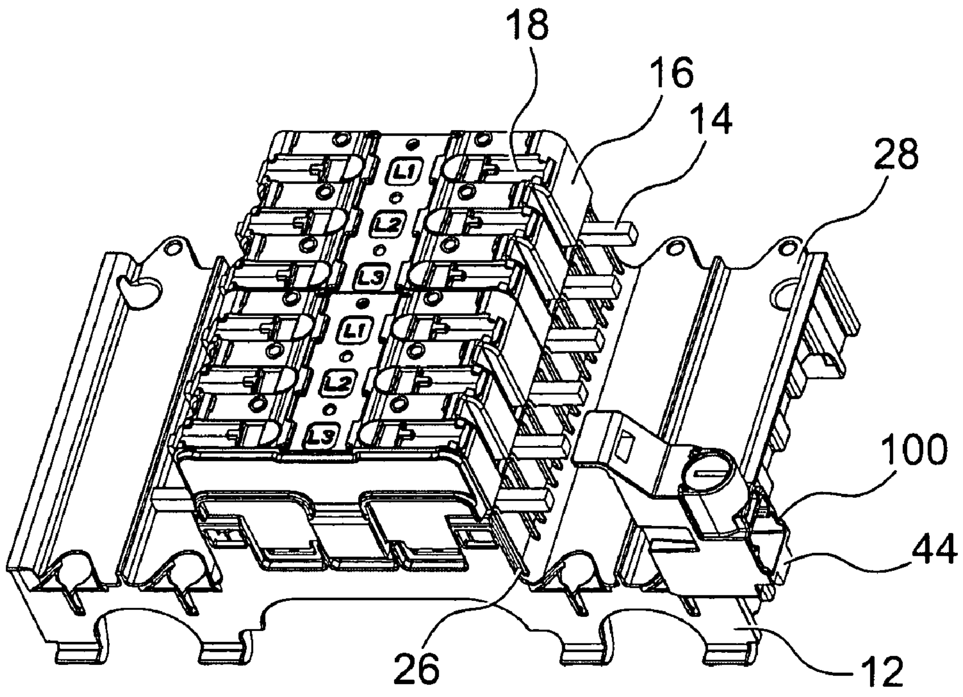
FIGS. 3*a* and 3*b* are perspective views of the shock prevention device of FIG. 2 in a disengaged and engaged state, respectively, with part of an electrical distribution board.
Figure 3B:
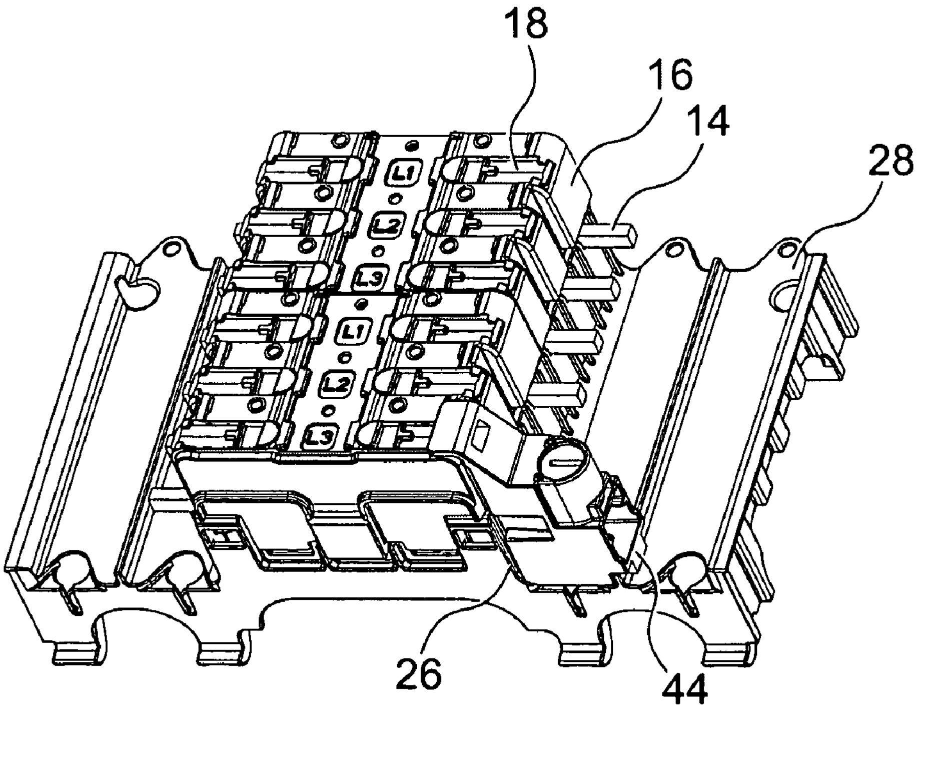
Figure 4A:
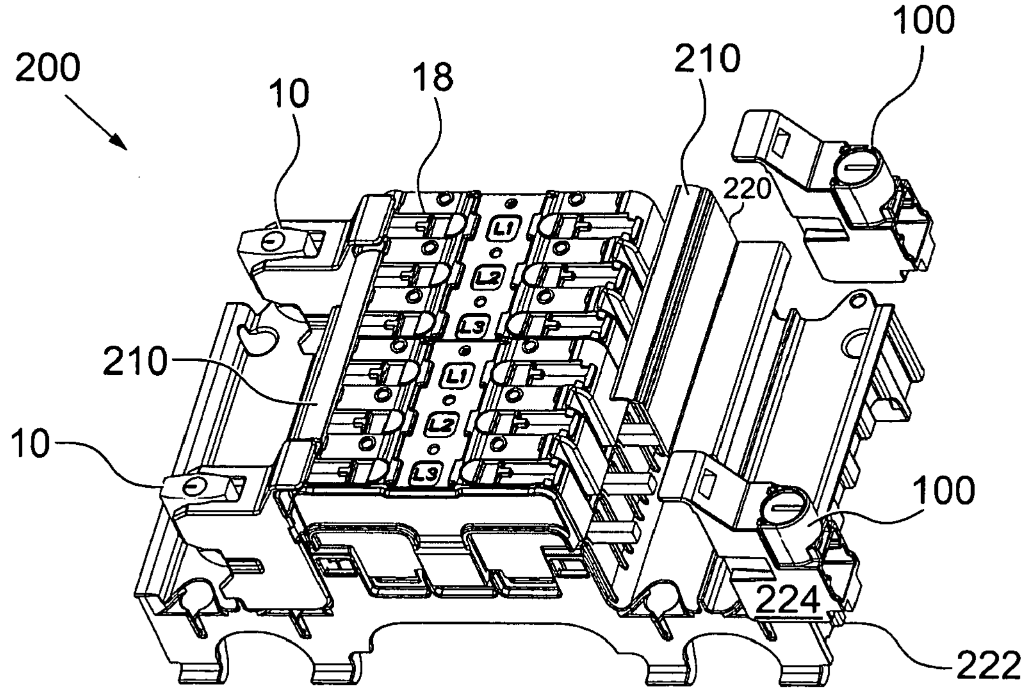
FIGS. 4*a* and 4*b* are perspective views of the shock prevention devices of FIGS. 1 and 2 being assembled with part of an electrical distribution board together with a cover member.
Figure 4B:
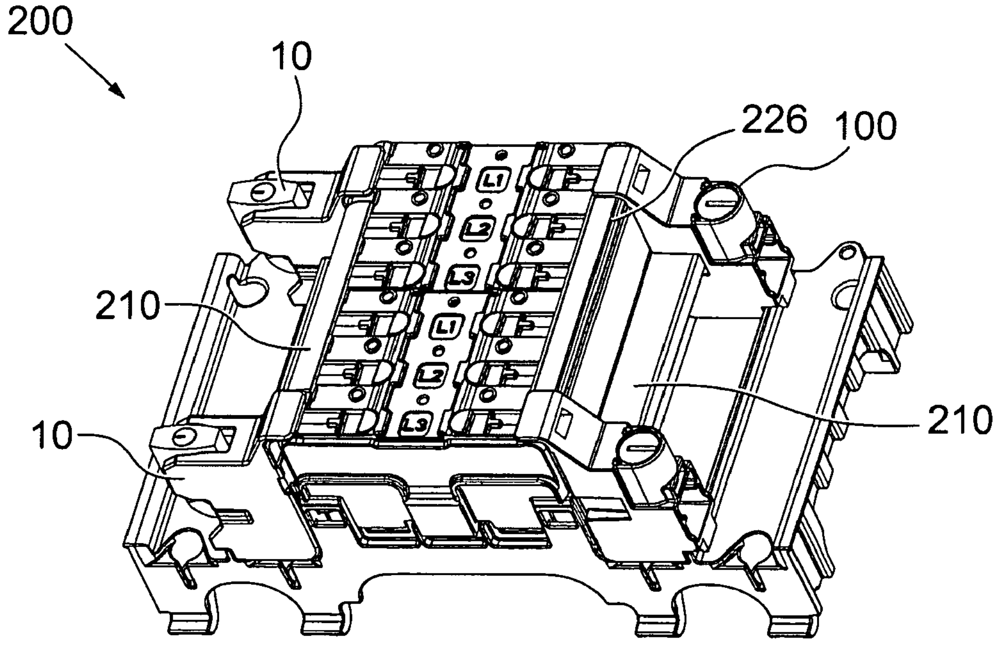
Figure 5A:
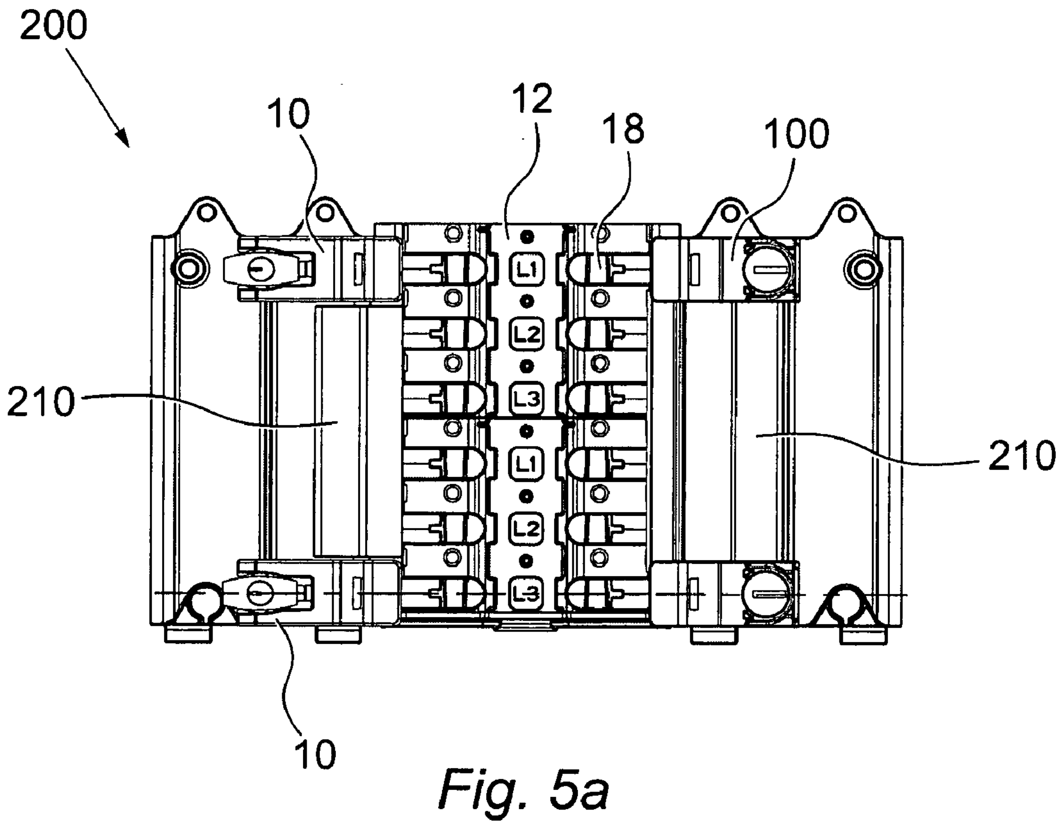
FIGS. 5*a* and 5*b* are top and left side views of the assembled shock prevention devices and cover member of FIG. 4*b*.
Figure 5B:
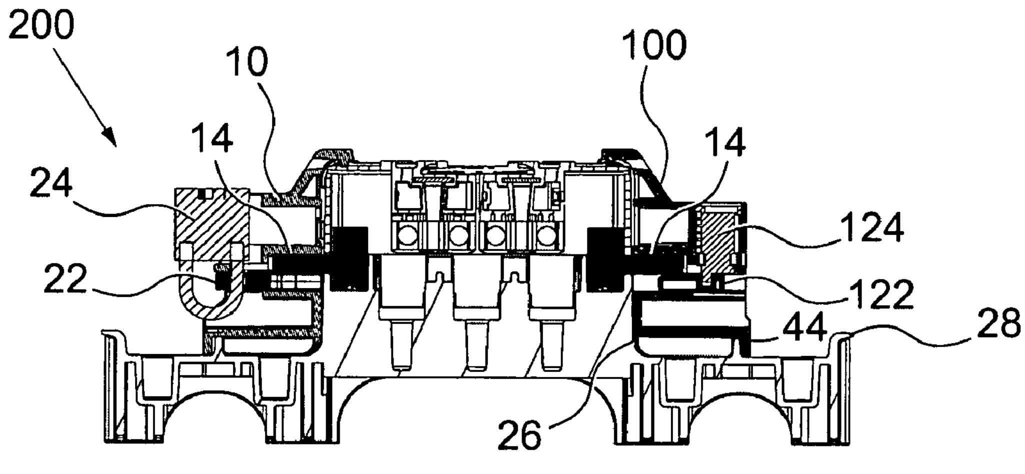

With reference to FIGS. 3*a* and 3*b*, the device 10 is adapted to fit into an L-shaped profile 26 in the housing 16 of the distribution board 12. One leg of the profile 26 of the housing 16 has the stab 14 projecting therefrom and the other leg has a circuit breaker mounting rail 28 projecting therefrom. The mounting rail 28 may be a DIN rail, or the like.

In order to attach the device 10 to the distribution board 12, the moveable element 22 is moved to the first position (FIG. 1*a*) and the device 10 is fitted into the L-shaped profile 26 by, for example, pivoting the device about a pivot point 36 located towards a top side 38 of the device 10. The rear side 40 and bottom side 42 of the device 10 are complimentary in shape to the L-shaped profile 26 of the housing 16 and the bottom side 42 has an abutment portion 44 which abuts against the mounting rail 28 when the device 10 is in place. The abutment portion 44 and the mounting rail may be arranged such that the device 10 may snap fit into engagement with the housing 16. In this configuration (an example of a first configuration) the device 10 may be removed from the distribution board 12 by simply disengaging the abutment portion 44 from the mounting rail 28 and pivoting the insulating body 20 out of and away from the housing 16.

Once the device 10 is attached to the distribution board 12, the moveable element 22 is moved to the second position in which the abutment portion 32 abuts against the lower, or rear, side portion of the stab 14. As illustrated in FIG. 2*f*, the moveable element 22 comprises retaining means 22*a*. The retaining means 22*a*, in the embodiment described here, are two protrusions located at the opposite end from the locking means 24. The protrusions snap fit into engagement with the interior of the insulating body 20 to hold the moveable element 22 captive in the body 20. Depending on the form of the interior of the body, these or further projections may be used to provide a detent action, keeping the moveable element 22 from falling out of the second position.

In this configuration (an example of a second configuration) the device 10 is braced between the stab 14 and the housing 16 and is prevented from being removed therefrom, as the engagement between the moveable element 22 and the stab 14 prevents the device 10 from pivoting out and away from the housing 16, and the engagement between the abutment portion 44 of the insulating body 20 and the mounting rail 28 prevents the device 10 being pulled in the horizontal direction away from the stab 14.

With the device 10 attached to the distribution board 12 and the moveable element 22 in the second position, the locking means 24 may be used to lock the moveable element 22 in the second position. Thus, the device 10 may not be accidentally removed from the distribution board 12.

The device 10 is dimensioned such that it is possible to mount a number of devices 10 to adjacent stabs 14 without interference therewith.

In the embodiment described here the locking means 24 comprises a padlock which loops through an aperture 46 in the body 30 of the moveable element 22 and a corresponding aperture (not shown) in the insulating body 20. However, it should be appreciated that any suitable locking means may be used to lock the moveable element 22 in the second position. An example of an alternative locking means is illustrated in FIGS. 2*a* to 2*f*, in which the padlock has been replaced with a key- or tool-operated barrel lock 124. The arrangement of the shock prevention device 100 of FIGS. 2*a* to 2*f* is almost identical to that of the first embodiment, the only difference is that the moveable element 122 is adapted to engages with the barrel lock 124 via a clip 121 (an example of a corresponding recess) located at the rear of the body 130 of the moveable element 122.

In order to remove the device 10 from the distribution board 12, the locking means 24 is unlocked and the moveable element 22 is moved back to the first position. In this position the passage 34 of the body 30 of the moveable element 22 is located immediately below the stab 14. Thus, as the device 10 is pivoted upwards and away from the housing 16, the stab 14 passes through the passage 34, allowing removal of the device 10.

As illustrated in FIGS. 1*a* and 3*b*, the insulating body 20 is adapted such that when the device 10 is attached to the distribution board 12 the rear side 40 extends above the isolation switch 18 of the distribution board 12. Thus, the insulating body 20 provides an abutment portion 48 which abuts against the isolation switch 18 and prevents the isolation switch 18 sliding into the “on” position.

FIGS. 4*a* to 5*b* also illustrate two shock prevention kits 200. Each kit 200 comprises two shock prevention devices 10, 100, as described above, and a cover member 210 which extends between each device 10, 100. The cover member 210 covers the stabs 14 between each device 10, 100. The shock prevention kit 200 allows a number of stabs 14 to be covered at one time without the need for individual devices 10, 100 shrouding each stab 14.

The cover member 210 has a generally S-shaped profile 220 and is configured to sit on top of the stabs 14. The cover member 210 is held in place by engaging with slots 222 located in the side walls 224 of the each device 10, 100 (note that the slots 222 are only illustrated in the device 100). In order to attached the kit 200 to the distribution board 12, the cover member 210 is firstly slotted into engagement with each of the devices 10, 100 and then the kit 200 as a whole is pivoted into engagement with the distribution board 12, as described above. The cover member 210 may be adapted to snap fit into engagement with each device 10, 100. With the kit 200 mounted to the distribution board 12 each device 10, 100 is then secured and locked in position, as described above.

The cover member 210 also has an abutment portion 226 which extends above the isolation switches 18 to prevent the operation of the switches 18 in the same manner as described above.

The shock prevention device 10 therefore obviates or mitigates the disadvantages of previous proposals, as the stab 14 is prevented from being re-energised accidentally. Providing means for locking the moveable element in the second configuration ensures that only the person who locks the device 10 to the distribution board 12 can unlock the device once they are finished working on the outgoing circuit.

Modifications and improvements may be made to the above without departing from the scope of the present invention. For example, although the moveable element 22 has been illustrated and described above as engaging with the stab 14 by siding underneath the stab 14, it should be appreciated that the moveable element 22 may engage with the stab 14 in the second configuration in any other suitable manner. For example, the moveable element 22 may engage with the stab 14 in the second position by receiving at least a portion of the stab 14 therein. In this arrangement one or more projections may be provided on one of the stab 14 and the moveable element 22 and one or more corresponding recesses may be provided on the other of the stab 14 and the moveable element 22 and the moveable element 22 is engageable with the stab 14 by snap fitting the moveable element 22 with the stab 14.

Furthermore, although retaining means 22*a* has been described and illustrated above as being used to retain the moveable element 22 in the first position, it should be appreciated that the device 10 may be retained in the first configuration by any other suitable means. For example, one or more projections may be provided on one of the insulating body 20 and the moveable element 22 and one or more corresponding recesses may be provided on the other of the insulating body 20 and the moveable element 22 and the moveable element 22 is retained in the first configuration by a snap fit engagement between the moveable element 22 and the insulating body 20.

Also, although not illustrated or described above, it should also be appreciated that the insulating body 20 may additionally include a first cover (not shown) which extends over and substantially covers the isolation switch 18 to prevent hand operation thereof.

Furthermore, although not illustrated or described above, it should also be appreciated that the insulating body 20 may additionally include a second cover (not shown) which is either integrally formed with the body 20, or formed separately from the body 20, which is adapted to cover one or more adjacent stabs 14 which are not shrouded by the body 20. Where the second cover is formed separately from the body 20, the second cover may be held in place between the device 10 and the housing 16 when the device 10 is attached to the housing 16, as described above.

Also, although the device 10, 100 has been illustrated and described above as being adapted to receive and shroud one stab 14 only, it should be appreciated that the device 10, 100 may be adapted to receive and shroud two or more stabs 14. That is, the insulating body 20 may be enlarged such that the device 10, 100 can accommodate a plurality of stabs 14.

Furthermore, although the device 10, 100 has been described and illustrated above as comprising a single moveable element 22, it should be appreciated that the device 10, 100 may comprise one or more moveable elements 22. In particular, in the case where the device 10, 100 is adapted to receive and shroud one or more stabs 14, it may be necessary to provide a moveable element to engage with each of the furthest apart stabs 14.

Also, although the cover member 210 has been illustrated and described above as simply covering the stabs 14, it should be appreciated that the cover member 210 may alternatively receive and shroud each of the stabs 14.

Furthermore, the cover member 210 may additionally extend over and substantially cover the isolation switch 18 to prevent hand operation thereof.

Also, although the locking means 24 has been described above as comprising a padlock which loops through an aperture 46 in the body 30 of the moveable element 22 and an aperture in the insulating body 20, it should be appreciated that the locking means may only loop through an aperture in one of the body 30 and insulating body 20. In this case the locking means is arranged to block movement of the moveable element by, for example, abutment between the locking means and one of the body 30 and insulating body 20.

The invention claimed is:

1. A shock prevention device for an electrical distribution board having at least one incoming terminal and one or more bus conductors for distributing electrical power from the incoming terminal to a plurality of outgoing conductor terminals projecting from a housing of the distribution board, the shock prevention device comprising:

an insulating body adapted to receive and shroud at least one conductor terminal;

a moveable element moveable relative to the body so as to place the device in one of a first configuration in which the device can be fitted to or removed from the distribution board so as to cover the exposed terminal and a second configuration in which the device is braced between the conductor terminal and part of the distribution board housing, whereby removal of the device is prevented; and means for locking the moveable element in the second configuration.

2. A shock prevention device as claimed in claim 1, wherein the device is adapted to fit into an L-shaped profile in the distribution board housing, one leg of the L having the conductor terminal projecting therefrom and the other leg having a circuit breaker mounting rail projecting therefrom, removal of the device in the second configuration being prevented by engagement with the conductor terminal on the one hand and the mounting rail on the other.

3. A shock prevention device as claimed in claim 1, wherein the moveable element is arranged to engage the conductor terminal in the second configuration, while part of the body engages the mounting rail.

4. A shock prevention device as claimed in claim 1, wherein the moveable element is arranged to engage with the conductor terminal by abutting against a rear portion thereof in the second configuration.

5. A shock prevention device as claimed in claim 1, wherein the moveable element remains captive in the body when in the first configuration.

6. A shock prevention device as claimed in claim 5, wherein the moveable element is retained in the body by a snap fit engagement between the moveable element and the insulating body.

7. A shock prevention device as claimed in claim 1, wherein the distribution board further includes at least one mechanical isolation switch to electrically isolate one or more conductor terminals from the bus conductors and the shock prevention device includes a portion which is configured to prevent mechanical operation of the isolation switch.

8. A shock prevention device as claimed in claim 7, wherein the insulating body of the shock prevention device includes a first cover member which substantially covers the isolation switch to prevent hand operation thereof.

9. A shock prevention device as claimed in claim 1, wherein the insulating body is adapted to receive and shroud two or more conductor terminals.

10. A shock prevention device as claimed in claim 9, wherein the insulating body includes two or more moveable elements.

11. A shock prevention device as claimed in claim 1, wherein the shock prevention device includes a second cover member, the second cover member being adapted to cover at least a portion of one or more conductor terminals which are not received and shrouded by the insulating body.

12. A shock prevention kit for an electrical distribution board having at least one incoming terminal and one or more bus conductors for distributing electrical power from the incoming terminal to three or more outgoing conductor terminals projecting from a housing of the distribution board, the shock prevention kit comprising:

at least two shock prevention devices according to claim 1; and a cover member configured to be mounted between two shock prevention devices to cover at least a portion of at least one conductor terminal to prevent contact therewith, additional to conductor terminals covered by the moveable elements of the shock prevention devices.

* * * * *